United States Patent
Wu et al.

(10) Patent No.: US 6,693,669 B1
(45) Date of Patent: Feb. 17, 2004

(54) METHOD FOR REDUCING IMAGE BLURRING

(75) Inventors: Jing Wu, Carlton (AU); Xing Zhang, Menai (AU)

(73) Assignee: Motorola, Inc., Schaumburg, IL (US)

( * ) Notice: Subject to any disclaimer, the term of this patent is extended or adjusted under 35 U.S.C. 154(b) by 832 days.

(21) Appl. No.: 09/595,224

(22) Filed: Jun. 16, 2000

(51) Int. Cl.[7] ............................................... H04N 5/202
(52) U.S. Cl. ..................... 348/254; 348/345; 348/625; 358/532; 382/266
(58) Field of Search .......................... 348/207.99, 222.1, 348/229.1, 252, 253, 254, 255, 625, 671, 674, 606, 607, 678, 345, 349; 382/260, 266, 263, 199, 274, 255, 128; 358/518, 519, 520, 521, 532

(56) References Cited

U.S. PATENT DOCUMENTS

| | | | | |
|---|---|---|---|---|
| 5,369,436 A | * | 11/1994 | Kawakami et al. ......... | 348/355 |
| 5,717,789 A | * | 2/1998 | Anderson et al. ........... | 382/254 |
| 5,764,287 A | * | 6/1998 | Tatsumi ...................... | 348/254 |
| 5,886,797 A | * | 3/1999 | Shimura ..................... | 382/266 |
| 6,094,511 A | * | 7/2000 | Metcalfe et al. ............ | 382/260 |
| 6,463,167 B1 | * | 10/2002 | Feldman et al. ............ | 382/128 |
| 6,577,775 B1 | * | 6/2003 | Li ............................... | 382/274 |
| 2003/0161547 A1 | * | 8/2003 | Luo ............................ | 382/274 |

* cited by examiner

Primary Examiner—Tuan Ho
(74) Attorney, Agent, or Firm—Kenneth A. Haas

(57) ABSTRACT

A method for reducing blurring associated with objects forming part of a grey scale image. The method includes receiving (11) a set of image pixels and then calculating (12) a gradient value for each one of the image pixels in the set. A selecting step (13) selects candidate object edge pixels from the image pixels by comparing the gradient value for each one of the image pixels in the set with a threshold value. A determining step (14) then determines a distribution of number candidate object edge pixels with specific grey level values. Thereafter, candidate object edge pixels within said distribution that have the same grey level values are identically non-linearly modified at a modifying step 15.

14 Claims, 2 Drawing Sheets

METHOD FOR REDUCING IMAGE BLURRING

FIELD OF THE INVENTION

This invention relates to reducing blurring associated with objects forming part of a grey scale image represented by an array of pixels. The invention is particularly useful for, but not necessarily limited to, reducing blurring of a stored image that was obtained by a camera, wherein the image includes one or more out of focus objects.

BACKGROUND ART

Images, often called pictures, are often obtained by devices such as a camera or video. When an image is being obtained, for example by a camera, focussing is restricted to objects that are of a similar distance from the camera's lens and other objects in different distance will be out of focus and blurred. For instance, often when a picture is obtained, it is desirable, that both foreground and background objects are clearly represented. Unfortunately, if the foreground and background objects are spaced far apart relative to a camera lens, blurring of either foreground or background objects will occur.

Cameras have been developed to obtain pictures that reduced blurring of out of focus objects at the expense of degrading clarity of in focus objects. Therefore, the blurring may still occur thereby affecting picture quality.

SUMMARY OF THE INVENTION

It is an aim of the invention to overcome or alleviate at least one of the problems associated with reducing blurring associated with objects forming part of a grey scale image represented by an array of pixels.

According to one aspect of the invention there is provided a method for reducing blurring associated with objects forming part of a grey scale image, the method comprising the steps of:

receiving a set of image pixels;

calculating a gradient value for each one of said image pixels in said set, said gradient value being indicative of one or more edges of an object in said grey scale image;

selecting candidate object edge pixels from said image pixels in said set, said selecting being effected by comparing said gradient value for each one of said image pixels in said set with a threshold value;

determining a distribution of number candidate object edge pixels with specific grey level values; and non-linearly modifying one or more said grey level values of said candidate object edge pixels, wherein candidate object edge pixels within said distribution that have the same grey level values are identically non-linearly modified.

Preferably, said selecting determines candidate object edge pixels when said gradient value for each one of said image pixels in said set is larger than said threshold value.

Preferably, said selecting determines candidate object edge pixels when said gradient value for each one of said image pixels in said set is at least equal to said threshold value.

Suitably, said step of non-linearly modifying includes:

identifying extremities of said distribution and leaving said grey level values of said candidate object edge pixels at said extremities unchanged. Suitably, no more than 10% of a lower distribution extremity will be unchanged. In a similar suitable manner, no more than 10% of an upper distribution extremity will be unchanged.

Preferably, said step of non-linearly modifying further includes:

modifying said grey level values of said candidate object edge pixels between extremities of said distribution and half a standard deviation of said distribution by an amount dependent upon the grey level value of the candidate object edge pixels and said standard deviation.

Preferably, said step of Non-linearly modifying further includes:

modifying grey level values of said candidate object edge pixels between half a standard deviation and a mean of said distribution by an amount dependent upon said mean of said distribution.

Suitably, said step of determining a distribution is effected on a subset of said candidate object edge pixels.

Preferably, said step of determining a distribution is effected by a localised histogram generator operating on a small set of said candidate object edge pixels from a localised area of the image.

Suitably, the method is performed by a digital camera.

BRIEF DESCRIPTION OF THE DRAWINGS

In order that the invention may be readily understood and put into practical effect, reference will now be made to preferred embodiments as illustrated with reference to the accompanying drawings in which.

DETAILED DESCRIPTION OF THE PREFERRED EMBODIMENT OF THE INVENTION

Figure 1:
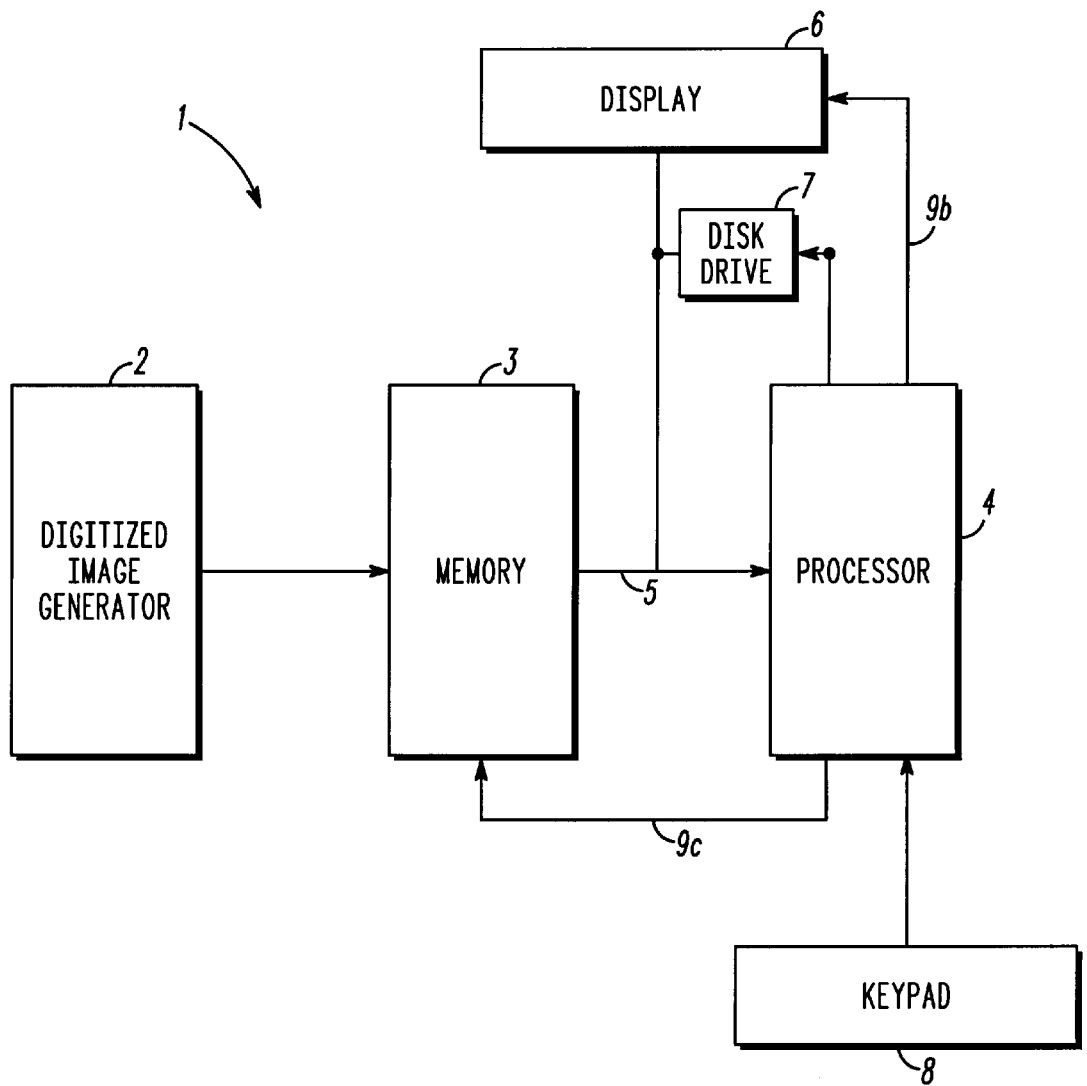
FIG. 1 is a schematic block diagram of a digital camera.

With reference to FIG. 1 there is illustrated an image processor in the form of a digital camera 1 comprising a digitised image generator 2 having outputs coupled to a memory 3. The digitised image generator 2 is typically a Charged Coupled Device as will be apparent to a person skilled in the art. The memory 3 is coupled to a processor 4 by a bus 5. A display 6 and disc drive 7 are also coupled to processor 4 by bus 5 and a user interface, in the form of a keypad 8, has outputs connected to processor 4. A as will be apparent to a person skilled in the art, control lines 9a, 9b, 9c connect outputs of processor 4 to inputs of memory 3, display 6 and disc drive 7.

Figure 2:
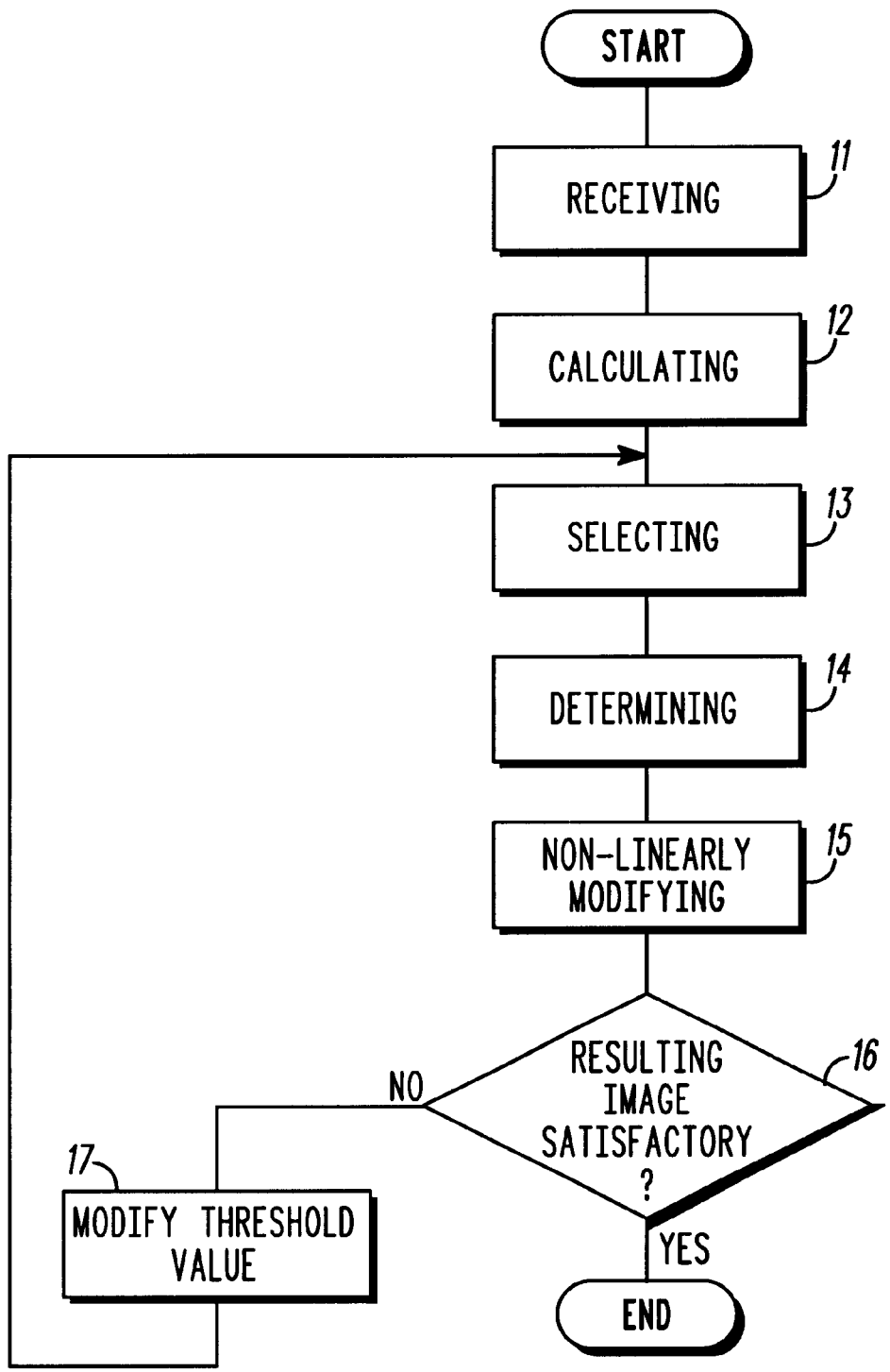
FIG. 2 is a flow diagram of a method for reducing blurring associated with objects forming part of a grey scale image in accordance with a preferred embodiment of the invention.

Referring to FIG. 2, there is illustrated a method for reducing blurring associated with objects forming part of a grey scale image (I) captured by digital camera 1. The method can be effected by camera 1 and comprises a receiving step 11, wherein a set of grey scale image pixels (Ip) forming a complete or part of an the grey scale image (I) are provided by digitised image generator 2 and then stored in memory 3. A user can then send commands by keypad 8 in order to view an image on display 6 that is stored in memory 3. When commands from keypad 8 are received by processor 4 to effect deblurring of the image (I), a calculating step 12 is invoked thereby calculating a gradient value for each one of the image pixels (Ip), the gradient value being indicative of one or more edges of an object in the grey scale image (I). The gradient value G(x,y) for each one of the image pixels (Ip) is calulculated by computing Absolute Approximate Gradients using Sobel operators SX and SY as will be apparent to a person skilled in the art. Accordingly, gradients Gx, in the horizontal direction and GY in the vertical direction for each of the image pixels are found by convolving the image (I) with Sobel operators SX and SY respectively, wherein $$S_x = \begin{bmatrix} -1 & 0 & 1 \\ -2 & 0 & 2 \\ -1 & 0 & 1 \end{bmatrix},$$

and $$S_y = \begin{bmatrix} -1 & -2 & -1 \\ 0 & 0 & 0 \\ 1 & 2 & 1 \end{bmatrix}$$

Hence, the approximate gradient value G(x,y) for each image of the pixels (Ip) in the set is obtained as follows:

$$G(x, y) = |G_x(x,y)| + |G_y(x,y)|$$

The gradient value G(x,y) indicates which image pixels (Ip) are edge pixels. A selecting step 13 then occurs in which there are selected candidate object edge pixels (Ep) from the image pixels (Ip) in the set, the selecting step 13 being effected by comparing the gradient value G(x,y) for each one of the image pixels (Ip) in the set with a threshold value T. In this regard, the selecting step 13 determines candidate object edge pixels when the gradient value G(x,y) for each one of the image pixels in the set is larger than the threshold value T. However, in one alternative form, the selecting step 13 could determine candidate object edge pixels when the gradient value G(x,y) for each one of the image pixels in the set is at least equal to the threshold value T. AS will be apparent to a person skilled in the art, the threshold value T may be initially set to a default value. Alternatively, the threshold value T can be selected by a user prior commencement of the method.

After the selecting step 13 there is a determining step 14 that determines a localised distribution of number candidate object edge pixels (Ep) with specific grey level values. This is effected by a local histogram generator operating on a small set of candidate object edge pixels (Ep) from a localised area of the image (I). Thereafter, a non-linearly modifying step 15 is effected in which one or more of the grey level values of the candidate object edge pixels (Ep) are non-linearly modified.

The candidate object edge pixels (Ep) within the distribution that have the same grey level values are identically non-linearly modified. The step of non-linearly modifying 15 includes identifying extremities of said distribution and leaving grey level values of said candidate object edge pixels (Ep) at the extremities unchanged. Typically, no more than 10% of a lower distribution extremity will be unchanged. In a similar suitable manner, no more than 10% of an upper distribution extremity will be unchanged. However, grey level values of candidate object edge pixels (Ep) between the extremities and half a standard deviation of the distribution are modified by an amount dependent upon the grey level value of the candidate object edge pixels and a standard deviation of the distribution. Further, grey level values of the candidate object edge pixels (Ep) between half a standard deviation and a mean of the distribution are modified by an amount dependent upon the mean of said distribution. The formula that is used in the step of non-linearly modifying 15 is given below in expression(1).

$$P(r) = \begin{cases} r & \text{if } r < r_1 \\ (P(r_2) - r_1) * \dfrac{r - r_1}{r_2 - r_1} + r_1 & \text{if } r_1 \le r < r_2 \\ \alpha * (r - r_3) + r_3 & \text{if } r_2 \le r < r_4 \\ (r_5 - P(r_4)) * \dfrac{r - r_5}{r_5 - r_4} + r_5 & \text{if } r_4 \le r < r_5 \\ r & \text{if } r_5 < r \end{cases} \quad (1)$$

wherein, r is a grey level value for each one of the candidate object edge pixels (Ep) before the step of non-linearly modifying; P(r) is a grey level value for each one of the candidate object edge pixels (Ep) after the step of non-linearly modifying; $\alpha$ is a constant; $r_1$ is a grey level below which grey level values are unchanged; $r_2$ is the mean value of the distribution$-\sigma/2$; $\sigma$ is the standard deviation of the distribution; $r_3$ is the mean value of the distribution; $r_4$=mean value$+\sigma/2$; $r_5$ is a grey level above which grey level values are unchanged.

After the step 15 a user has the option of viewing a processed version of the image (I) at display 6 to determine if blurring is acceptable or reduced. At step 16 the user can input by keypad 8 a command Yes or No. If the command is No then at step 17 the user can modify the threshold value T and steps 13 to 16 will be repeated. If at step 16 the user responds with a Yes then the method is terminated and a reduced blurred image (Ir) is stored in memory 3 and, if desired, this image (Ir) can be stored on disc inserted in disc drive 7.

Advantageously, the present invention allows for reducing blurring of a grey scale image. For instance, when considering different objects in the image (I), the ranges of the intensity values around the blurred edges varies. The use of a global histogram and liner modification could reduce some of the blurring, but may also introduce distortion to other objects. To avoid introducing the possibility of distortion, the invention may preferably use an adaptive deblurring approach. Therefore, the intensity level of pixels around blurred boundaries are changed according to a localised distribution (or histograms) of number candidate object edge pixels (Ep) calculated from a set of candidate object edge pixels (Ep) from a localised area of the image (I). Typically, the size of the localised area should be big enough to have a sufficient number of pixels to describe intensity changes in a local area. However, the localised area size should not be too large in order to avoid possible image degradation.

Another advantage of the present invention is that the non-linearly modifying step 15, allows for the intensity levels of the candidate object edge pixels (Ep) in high gradient portions of a localised distribution are stretched toward the intensity level of non-edge areas on both sides of an edge of an object. Such an operation effectively reduces the number of pixels needed for intensity transaction between non-edge areas. As a result, blurred edges can appear more focussed.

Although the invention has been described with reference to a preferred embodiment, it is to be understood that the invention is not restricted to the particular embodiments described herein. For example the invention can be used for autofocusing, before pictures are taken or post processing when digital images are downloaded from a camera.

We claim:

1. A method for reducing blurring associated with objects forming part of a grey scale image, the method comprising the steps of:
   receiving a set of image pixels;
   calculating a gradient value for each one of said image pixels in said set, said gradient value being indicative of one or more edges of an object in said grey scale image;
   selecting candidate object edge pixels from said image pixels in said set, said selecting being effected by comparing said gradient value for each one of said image pixels in said set with a threshold value;
   determining a distribution of number candidate object edge pixels with specific grey level values; and
   non-linearly modifying one or more said grey level values of said candidate object edge pixels, wherein candidate object edge pixels within said distribution that have the same grey level values are identically non-linearly modified.

2. A method as claimed in claim 1, wherein said selecting determines candidate object edge pixels when said gradient value for each one of said image pixels in said set is larger than said threshold value.

3. A method as claimed in claim 1, wherein, said selecting determines candidate object edge pixels when said gradient value for each one of said image pixels in said set is at least equal to said threshold value.

4. A method as claimed in claim 1, wherein, said step of non-linearly modifying includes:
   identifying extremities of said distribution and leaving said grey level values of said candidate object edge pixels at said extremities unchanged.

5. A method as claimed in claim 4, wherein no more than 10% of a lower distribution extremity is unchanged.

6. A method as claimed in claim 4, wherein no more than 10% of an upper distribution extremity is unchanged.

7. A method as claimed in claim 4, wherein said step of non-linearly modifying further includes:
   modifying said grey level values of said candidate object edge pixels between said extremities and half a standard deviation of said distribution by an amount dependent upon the grey level value of the candidate object edge pixels and said standard deviation.

8. A method as claimed in claim 7, wherein said step of Non-linearly modifying includes:
   modifying grey level values of said candidate object edge pixels between half a standard deviation and a mean of said distribution by an amount dependent upon said mean of said distribution.

9. A method as claimed in claim 1, wherein said step of Non-linearly modifying includes:
   modifying grey level values of said candidate object edge pixels between half a standard deviation and a mean of said distribution by an amount dependent upon said mean of said distribution.

10. A method as claimed in claim 8, wherein said step of Non-linearly modifying includes:
    modifying grey level values of said candidate object edge pixels between half a standard deviation and a mean of said distribution by an amount dependent upon said mean of said distribution.

11. A method as claimed in claim 1, wherein said step of Non-linearly modifying includes:

$$P(r) = \begin{cases} r & \text{if } r < r \\ (P(r_2) - r_1) * \dfrac{r - r_1}{r_2 - r_1} + r_1 & \text{if } r_1 \leq r < r_2 \\ \alpha * (r - r_3) + r_3 & \text{if } r_2 \leq r \leq r_4 \\ (r_5 - P(r_4)) * \dfrac{r - r_5}{r_5 - r_4} + r_5 & \text{if } r_4 < r \leq r_5 \\ r & \text{if } r_5 < r \end{cases}$$

wherein, r is a grey level value for each one of the candidate object edge pixels (Ep) before the step of non-linearly modifying; P(r) is a grey level value for each one of said candidate object edge pixels after the step of non-linearly modifying; $\alpha$ is a constant; $r_1$ is a grey level value below which grey level values are unchanged; $r_2$ is the mean value of said distribution$-\sigma/2$; $\sigma$ is a standard deviation of the distribution; $r_3$ is a mean value of said distribution; $r_4$=said mean value$+\sigma/2$; $r_5$ is a grey level above which grey level values are unchanged.

12. A method as claimed in claim 1, wherein said step of determining a distribution is effected on a subset of said candidate object edge pixels.

13. A method as claimed in claim 1, wherein said step of determining a distribution is effected by a localised histogram generator operating on a small set of said candidate object edge pixels from a localised area of the image.

14. A method as claimed in claim 1, wherein the method is performed by a digital camera.

* * * * *